United States Patent [19]

Beall et al.

[11] Patent Number: 4,940,674

[45] Date of Patent: Jul. 10, 1990

[54] HIGH STRENGTH, HAZE-FREE, TRANSPARENT GLASS-CERAMICS

[75] Inventors: George H. Beall, Big Flats; Paul S. Danielson, Corning; Robert M. Morena, Caton, all of N.Y.

[73] Assignee: Corning Incorporated, Corning, N.Y.

[21] Appl. No.: 434,188

[22] Filed: Nov. 13, 1989

[51] Int. Cl.$^5$ .......................... C03C 3/22; C03C 3/04
[52] U.S. Cl. ........................................ 501/4; 501/61; 501/66; 501/67
[58] Field of Search .................... 501/4, 61, 66, 67

[56] References Cited

U.S. PATENT DOCUMENTS 4,391,914  7/1983  Beall ........................................ 501/4

Primary Examiner—Mark L. Bell
Attorney, Agent, or Firm—Clinton S. Janes, Jr.

[57] ABSTRACT

The present invention is directed to transparent, essentially haze-free glass-ceramic articles exhibiting moduli of rupture in excess of 10,000 psi which consist essentially, in weight percent, of 3-6% $Li_2O$, 17-23% $Al_2O_3$, 1-4% $B_2O_3$, 60-70% $SiO_2$, 3-6% $TiO_2$ and/or $ZrO_2$, 25-500 ppm $Cr_2O_3$, and 1-5 mole percent of a glass modifying oxide selected from the group consisting of 0-3% $K_2O$ and 0-2.5% SrO and/or BaO.

8 Claims, No Drawings

HIGH STRENGTH, HAZE-FREE, TRANSPARENT GLASS-CERAMICS

BACKGROUND OF THE INVENTION

This invention is directed to the strengthening of transparent glass-ceramic articles which exhibit low linear coefficients of thermal expansion. Glass-ceramic bodies conventionally exhibit greater mechanical strengths than the precursor glasses from which they are crystallized in situ. To illustrate, flexural strengths measured on abraded canes of standard annealed commercial glasses tend to range between about 4000-5000 psi. By comparison, flexural strengths measured on abraded canes of opaque glass-ceramics average about 12,000 psi. This significant improvement in strength permits the fabrication of articles which will be exposed to physical abuse having thinner walls than similar articles prepared from glass That capability has the advantage of enabling the production of articles of lighter weight, but with equivalent or even greater strength For example, a PYREX ® baking dish prepared from a borosilicate glass has much thicker walls and, hence, weighs considerably more than the same dish fashioned from CORNING WARE ® glass-ceramic, both products being marketed by Corning Incorporated, Corning, N.Y.

In contrast to opaque glass-ceramic materials, highly transparent glass-ceramics have conventionally demonstrated abraded flexural strengths averaging only about 8000 psi. Such relatively low mechanical strengths preclude the use of those materials in thin walled articles which may be exposed to physical abuse. Moreover, the potential for enhancing the strength of transparent glass-ceramic bodies is severely limited due to the very small size of the crystals present therein (commonly less than 0.1 micron) and the very low linear coefficients of expansion demonstrated by the bodies. Thus, classic techniques of improving strength, e.g., by some form of dispersion strengthening, would also impair transparency. The probable loss of transparency also rules out other standard techniques such as increasing the extent of crack-microstructure interaction through grain size coarsening. In addition, the very low coefficient of thermal expansion eliminates to a large extent the use of thermal tempering, in view of the fact that the bodies have a very low capacity to absorb residual strain energy during any quenching.

The technique of dilatation strengthening for use with glass-ceramics exhibiting low coefficients of thermal expansion was first described in U.S. Pat. Nos. 4,391,914 (Beall). As explained there, the technique is applied to glass-ceramics containing a lithium aluminosilicate (commonly a $\beta$-quartz solid solution and/or a $\beta$-spodumene solid solution) as the predominant, if not sole, crystal phase which exhibits a very low linear coefficient of thermal expansion, and a substantial amount of a residual glassy phase (normally a borosilicate or an aluminoborosilicate) which displays a much higher coefficient of thermal expansion. The two phases form a dilatant system wherein the thermal expansion curve changes markedly in character at a transition point in the range of about 500°-750° C.; the crystal phase dominating the expansion below that range and the glass phase controlling at the higher temperatures. The presence of $\beta$-quartz solid solution resulted in a body exhibiting high transparency, whereas the occurrence of $\beta$-spodumene solid solution resulted in translucent-to-opaque bodies.

As is disclosed in that patent, the residual glass phase comprises about 15-30% by volume of the crystallized body with the overall composition of the glass-ceramic consisting essentially, expressed in terms of weight percent on the oxide basis, of 2.5-7% $Li_2O$, 2-5% $B_2O_3$, 14-25% $Al_2O_3$, 0-2% MgO and/or ZnO, 60-80% $SiO_2$, 3-6% $TiO_2$ and/or $ZrO_2$, and 0.5-5% mole percent of glass modifying oxides selected from the group consisting of $Na_2O$, $K_2O$, CaO, BaO, SrO, and PbO, wherein the molar ratio $Al_2O_3$:$Li_2O > 1$. In the preferred embodiment the linear coefficient of thermal expansion of the glass phase will be at least $30 \times 10^{-7}/°C$. units greater than that of the crystal phase.

The patent cited two mechanisms underlying the enhancement in strength possible through the dilatation strengthening technique. Hence, because the glass phase has a significantly higher coefficient of thermal expansion than the crystal phase, it expands faster as the body is heated. Conversely, the glass contracts faster than the crystal when the body is cooled. The volume of glass ($\approx 15$–30%) is such as to form a continuous matrix at the temperatures employed to crystallize the precursor glass body in situ into a glass-ceramic; the crystals, while dominant in amount, are nevertheless separated in the glass matrix. As the crystallized body cools, however, the higher expansion glass contracts more rapidly and a point is reached where the crystals touch one another to form a crystalline network with the continuous glass network being destroyed and the glass occupying interstitial positions. This contraction of the glass sets up point compressive stresses in the crystalline network. As a consequence, fracture impediment due to a transgranular pattern develops with resultant fracture toughness.

More important to the development of increased strength, however, is the shape of the thermal expansion curve and its applicability to thermal tempering. The composition of the material is tailored so that the glassy phase is barely continuous, whereby its shrinkage causes geometric isolation at some temperature during cooling. On further cooling, the crystalline network controls the contraction curve. Therefore, when the surface of the glass-ceramic is quenched from the crystallization temperature, the body shrinks and quickly arrives at a rigid state of a continuous crystalline network. The body will not shrink further as the body cools still further, providing that the coefficient of thermal expansion of the crystals is close to zero. The interior of the body is cooling much slower, however, and must contract through the glass dominated, high thermal expansion regime while the body surface is rigid and not contracting. Stress in the form of surface compression is thereby induced, the magnitude thereof depending upon the volume shrinkage of the upper part of the expansion curve. Inasmuch as the glassy phase is normally somewhat plastic in the high temperature region, it withstands the severe shock of surface quenching. When the surface becomes entirely rigid, it exhibits a sufficiently low thermal expansion (being crystal dominated) to avoid cracking on further rapid cooling to room temperature.

For additional discussion regarding the mechanisms underlying dilatation strengthening, reference is made to Pat. No. 4,391,914, which patent is incorporated in full in the present disclosure.

Whereas abraded modulus of rupture values of 25,000 psi and even greater were measured on the opaque, betaspodumene solid solution-containing bodies and up to 20,000 psi on the statedly transparent beta-quartz solid solution-containing bodies described in U.S. Pat. No. 4,391,914, the dilatation strengthening practice to date has not been commercially realized with transparent articles. Thus, the practice has led to the production of haze, i.e., a loss of transparency, even in the clearest of the β-quartz solid solution-containing articles. And generally, those compositions exhibiting the highest tempered strengths also manifested the highest degree of haze. Furthermore, the time and the temperature range wherein a particular precursor composition could be crystallized in situ to a product exhibiting a minimum level of haze was very limited, thus demanding extreme care and control in carrying out the crystallization process.

Accordingly, the principal objective of the present invention was to develop high strength, i.e., abraded modulus of rupture values in the vicinity 10,000 psi, transparent glass-ceramic bodies which are essentially free from haze, wherein the predominant and substantially sole crystal phase is β-quartz solid solution which exhibits a linear coefficient of thermal expansion of less than $10 \times 10^{-7}$/°C.

A second and related objective was to discover compositions for such products which can be crystallized in situ over a relatively broad range of temperatures.

SUMMARY OF THE INVENTION

It was appreciated that the residual glass phase must play a vital role in the onset of haze in the final product, both through possible refractive index mismatch with the crystal phase present, as well as through its bearing on the size of the crystals grown in the body. The very limited range of temperatures within which the articles can be crystallized with very low haze strongly suggested that the development of haze was due primarily to accelerated crystal growth kinetics associated with the larger volume of residual glass, rather than to any index mismatch.

Therefore, as a first approach to the problem, it was determined to raise the viscosity of the residual glass. Thus, it was theorized that increasing the viscosity of residual glass, i.e., rendering it less fluid, while maintaining the total volume thereof roughly constant, would lead to a reduction in the rate of crystal growth, thereby not only improving the transparency of the final product, but also enlarging the operable crystallization range to yield transparent products.

In order to test out that theory, the viscosity of the aluminoborosilicate residual glass was raised via the replacement of a portion of the $B_2O_3$ with $K_2O$ and/or an alkaline earth metal selected from the group of SrO and BaO. Hence, it was found that the inclusion of about 1-5 mole percent total of those three oxides consisting of up to 3 mole percent $K_2O$ and up to 2.5 mole percent SrO and/or BaO resulted in a temperature increase of about 20°-50° C. in the annealing point of the residual glass. (In weight percent those maximum values approximate 4% $K_2O$, 4% SrO, and 3% BaO.) The bodies resulting therefrom exhibited a more uniform and generally lower level of haze (barely perceptible to the eye) and a considerably broader range of crystallization temperatures operable for producing minimum haze. Thus, in articles of relatively thin cross section, the glass-ceramics appeared to be substantially haze-free. In the most preferred products, however, the bodies should appear to be essentially haze-free in relatively thick cross section. Therefore, further research was undertaken to devise means for accomplishing that goal.

In pursuit of that goal it was recognized that, if the size of the crystals in the products could be reduced, the degree of haze ought to be decreased because the effects of light scattering would be diminished. That recognition led to an investigation of materials that might catalyze nucleation and, thereby, result in the development of a greater number of crystals, but of smaller dimensions. That investigation led to the discovery of the increased nucleation efficiency flowing from the presence of $Cr_2O_3$ in very minor amounts. Hence, the inclusion of as little as 25 ppm $Cr_2O_3$ exerts a marked effect in reducing haze, with the optimum addition being about 70-150 ppm (0.007-0.015%). Greater amounts can be used but with no substantive improvement in properties. Moreover, at levels of $Cr_2O_3$ greater than about 250 ppm, the articles take on a perceptible yellow/green color which becomes very pronounced at levels of 500 ppm. Such color can be masked through the addition of compensating colorants, but a concentration of about 250 ppm has been deemed to constitute a practical maximum to secure articles which are essentially haze free even in relatively thick cross section and do not exhibit high coloration.

In order to assure the essential absence of haze, the precursor glass articles will be crystallized in situ at temperatures not exceeding about 850° C. Laboratory experience had demonstrated, however, that thermal tempering by heating the article to temperatures above 850° C., but less than about 900° C., and then quenching yielded a body manifesting considerably greater strength, i.e., up to about 15,000 psi, than when that body was crystallized at temperature of 850° C. and lower. To take advantage of that discovery, the following general heat treatment schedule was devised:

(a) the precursor glass article was initially heated within the temperature interval known to produce crystallized articles with virtually no haze ($\approx 800°-850°$ C.) for a sufficient length of time to generate essentially complete crystallization;

(b) the temperature is thereafter raised very rapidly, viz., at least about 400° C./hour, to above the maximum for crystallizing haze-free articles, i.e., up to 900° C., desirably about 865°-885° C., and maintained thereat for a brief period of time, i.e., only for so long as to assure that the outside surface of the article attains a temperature high enough to induce substantial residual compressive stresses therein during subsequent quenching; an exposure time of at least two minutes, but less than 10 minutes, customarily about 3-6 minutes, to the high temperature has generally been found to be sufficient for that purpose; and then (c) the article is quenched to room temperature, desirably in an oil bath. Laboratory experimentation has indicated that such brief high temperature exposure does not appear to exert any perceptible adverse effect upon the development of haze, so long as care is taken to assure that the exposure is brief, but its positive effect upon strength enhancement is unmistakable. Alternatively, the article may be quenched in a stream of cool air or in a water spray.

In summary, transparent glass-ceramic articles which display essentially no haze, which contain about 15-30% by volume of an aluminoborosilicate glass and β-quartz solid solution as essentially the sole crystal phase, and which exhibit abraded moduli of rupture in the vicinity of 10,000 psi can be prepared as follows:

(1) a batch for a glass consisting essentially, expressed in terms of weight percent on the oxide basis, of 3-6% $Li_2O$, 17-23% $Al_2O_3$, 1-4% $B_2O_3$, 60-70% $SiO_2$, 3-6 $TiO_2$ and/or $ZrO_2$, at least 25 ppm $Cr_2O_3$, and 1-5 mole percent of glass modifying oxides selected from the group consisting of 0-3% $K_2O$ and 0-2.5% SrO and/or BaO, with a molar ratio $Al_2O_3$ $Li_2O>1$ is melted;

(2) the melt is cooled and a glass body of a desired configuration is simultaneously shaped therefrom; and then (3) the glass body is exposed to a temperature between about 800°-850° C. and maintained thereat for a period of time sufficient to cause crystallization in situ of β-quartz solid solution crystals therein. To assure good uniformity in the dimensions of the crystals generated, the glass body will normally be initially subjected to a nucleation heat treatment at about 700°-775° C. for about 1-4 hours, and the temperature thereafter raised to effect the growth of crystals on the nuclei.

In the preferred compositions both $K_2O$ and BaO will be included; $K_2O$ being present in amounts of about 1-3% by weight and BaO in amounts of about 0.5-2.5% by weight. In the most preferred embodiment, $Cr_2O_3$ will be included in an amount of about 25 ppm, most desirably about 70-150 ppm, with about 250 ppm being deemed a practical maximum.

The time required to achieve virtually complete crystallization is, as would be expected, a function of the temperature employed; a longer time being required at the lower extreme of the operable temperature interval. Hence, for articles of like bulk, exposure periods as brief as 15-30 minutes may be sufficient at the higher temperatures, whereas times of two hours and more may be needed at the lower temperatures.

As noted above, increased strength can be imparted to the glass-ceramic articles via thermal tempering involving exposing the crystallized articles for a brief period at temperatures between 850°-900° C. and then quickly chilling them.

Prior Art

U.S. Pat. No. 4,391,914 was discussed in considerable detail above where it was acknowledged that the fundamental concepts of dilatation strengthening are described therein, and that the present invention constitutes an improvement upon that disclosure. As was explained, however, that patent does not suggest the idea of increasing the viscosity of the residual glass, to incorporate $Cr_2O_3$ in the composition, and to thermally temper the glass-ceramic article in a manner to avoid the generation of haze while achieving the highest strength.

U.S. Pat. No. 3,149,982 (Eppler) was directed to the production of glass-ceramic articles containing synthetic fluorophlogopite mica as the predominant crystal phase ($KMg_3AlSi_3O_{10}F_2$) wherein 0.2-10% by weight $Cr_2O_3$ was utilized as the nucleating agent. No mention is made of transparent bodies containing β-quartz solid solution and the base compositions are far removed from those of the present invention. Moreover, the minimum 0.2% $Cr_2O_3$ (2000 ppm) is about an order of magnitude greater than the levels found suitable in the present invention.

U.S. Pat. No. 3,146,114 (Kivlighn) was drawn to the preparation of glass-ceramic articles containing plagiodase or nepheline as the predominant crystal phase utilizing a variety of nucleating agents, one of which was 0.08-0.5% $Cr_2O_3$. In like manner to U.S. Pat. No. 3,149,982, there is no reference to transparent glass-ceramic bodies containing β-quartz solid solution; the base compositions are quite remote from those of the present invention; there is no suggestion of thermally tempering the articles; and the minimum 0.08% $Cr_2O_3$ far exceeds the quantities used in the present invention. Furthermore, the patent describes the $Cr_2O_3$ precipitating out as crystalline chromite.

U.S. Pat. No. 3,681,102 (Beall) disclosed the preparation of transparent glass-ceramic articles containing gahnite as the predominant crystal phase from glasses having compositions in the $ZnO-Al_2O_3-SiO_2$ system nucleated by $ZrO_2$. The products can be doped with 0.01-1% $Cr_2O_3$ to yield red transparent articles exhibiting photoluminescence similar to that displayed by $Cr_2O_3$-doped corundum crystals. The final products are expressly stated to be free from silicate-containing crystals; hence, eliminating the presence of β-quartz solid solution. Moreover, the base compositions are far removed from those of the present invention.

Description of Preferred Embodiments

Table I records a group of glass compositions illustrating the parameters of the present invention expressed in terms of parts by weight on the oxide basis. However, inasmuch as the sum of the individual components totals or closely approximates 100, for all practical purposes the tabulated values may be deemed to represent weight percent. The actual batch ingredients may comprise any materials, either oxides or other compounds, which, when melted together, will be converted into the desired oxide in the proper proportions. For example, $Li_2CO_3$ and $BaCO_3$ may constitute the source of $Li_2O$ and BaO, respectively.

The batch constituents were compounded, ballmilled together to assist in obtaining a homogeneous melt, and charged in platinum crucibles. The crucibles were introduced into a furnace operating at about 1600° C. and the batches melted for about 16 hours without stirring. The melts were poured into steel molds to produce glass slabs having dimensions of about $8''\times4''\times0.5''$ ($\approx 20.3\times10.2\times1.3$ cms), and those slabs were immediately placed into an annealer operating at about 650° C. $As_2O_3$ was included in the batch to perform its conventional function as a fining agent. $Fe_2O_3$ and $Co_3O_4$ were incorporated to assure a neutral color in the crystallized body.

TABLE I

|   | 1 | 2 | 3 | 4 | 5 | 6 | 7 |
|---|---|---|---|---|---|---|---|
| $SiO_2$ | 65.6 | 65.5 | 65.5 | 65.5 | 65.4 | 65.4 | 65.4 |
| $Al_2O_3$ | 19.9 | 19.9 | 19.9 | 19.9 | 19.8 | 19.7 | 19.7 |
| $B_2O_3$ | 2.3 | 2.3 | 2.3 | 2.3 | 2.3 | 2.0 | 1.9 |
| $Li_2O$ | 4.3 | 4.3 | 4.3 | 4.3 | 4.3 | 4.3 | 4.3 |
| $K_2O$ | 1.9 | 1.9 | 1.9 | 1.9 | 1.9 | 1.8 | 1.8 |
| BaO | 1.3 | 1.3 | 1.3 | 1.3 | 1.3 | 1.9 | 2.0 |
| $TiO_2$ | 2.5 | 2.5 | 2.5 | 2.5 | 2.5 | 2.5 | 2.5 |
| $ZrO_2$ | 1.2 | 1.2 | 1.2 | 1.2 | 1.2 | 1.2 | 1.2 |
| $Cr_2O_3$ | — | 0.007 | 0.015 | 0.025 | 0.014 | 0.006 | 0.008 |
| $Fe_2O_3$ | — | — | — | — | 0.11 | 0.085 | 0.040 |
| $Co_3O_4$ | — | — | — | — | 0.013 | 0.006 | 0.003 |
| $As_2O_3$ | 1.0 | 1.0 | 1.0 | 1.0 | 1.0 | 1.0 | 1.0 |

The slabs were introduced into an electrically heated furnace, and the temperature therein was raised at about 400° C./hour to about 710°-730° C. as recorded in Table II. After holding at that temperature for about 2-3 hours to promote good nucleation, the temperature was raised at about 400° C./hour to that recorded in Table II, and that latter temperature was maintained for about 0.5 hour. X-ray diffraction analyses indicated the presence of β-quartz solid solutions as essentially the sole crystal phase.

To quantify the extent of haze development in the crystallized samples, a laser scattering apparatus was used to measure, among other phenomena, the angular dependence of scattering in phase separated glasses to obtain information on dispersed phase particle size. The equipment has the important advantage in that haze calculations are based upon the intensities of both the transmitted and scattered beams, such that the effect of any absorption caused by colorants present in the test specimen is eliminated.

With the present examples, light scattering measurements were made at 90° to the incident beam to obtain Rayleigh scattering ratios and turbidity values. The transmittance of the specimen was utilized as a measure of transparency. Each specimen comprised a rectangular prism having the dimensions of $1 \times 1 \times 4$ cm, with all sides polished. Five measurements were made at each of three randomly selected positions in each test specimen and then averaged together to determine the turbidity and transmittance values. The following provides a qualitative visual appraisal of measurements made with the laser scattering apparatus:

| % Transmittance | Appearance |
| --- | --- |
| <80% | Translucent to opaque |
| 80–90% | Hazy, noticeable to barely perceptible |
| >90% | No perceptible haze |

TABLE II

| Example | Heat Treatment | Transmittance |
| --- | --- | --- |
| 1 | 710° C./3 hrs. 810° C./0.5 hr. | 85 |
| 2 | 730° C./3 hrs. 835° C./0.5 hr. | 92 |
| 3 | 730° C./3 hrs. 835° C./0.5 hr. | 93 |
| 4 | 730° C./3 hrs. 835° C./0.5 hr. | 88 |
| 5 | 730° C./2 hrs. 820° C./0.5 hr. | 92 |
| 6 | 730° C./2 hrs. 820° C./0.5 hr. | 96 |
| 7 | 730° C./2 hrs. 835° C./0.5 hr. | 95 |

Example 1 represents glass-ceramics having compositions within U.S. Pat. No. 4,391,914 which exhibit very low, but yet perceptible, haze. Examples 2-7 demonstrate the significant effect which the inclusion of very low concentrations of $Cr_2O_3$ can have on the degree of haze; in essence, providing an essentially haze-free body.

To illustrate the substantial increase in strength, while not significantly impacting upon the development of haze, resulting from thermally tempering the present inventive glass-ceramics, samples of Example 7 were nucleated for two hours at 730° C. in like manner to the sums of Table II and then crystallized by holding at 835° C. for about 20 minutes. Thereafter, the samples were heated to 865° C. at a rate of 600° C./hour, held at that temperature for 6 minutes, and quenched in silicone oil. The samples exhibited an average linear coefficient of thermal expansion (25°–500° C.) of about $5 \times 10^{-7}$/°C., a transmittance of higher than 90%, and an abraded modulus of rupture of about 14,600 psi, this latter value indicating about a 50% improvement in flexural strength when compared with the products not subjected to thermal tempering.

To illustrate the criticality of composition and heat treatment in obtaining essentially haze-free, transparent glass-ceramics, the glasses listed below in Table III in parts by weight were melted and crystallized in situ. Examples 8, 9, and 10 correspond to Examples 7, 8, and 9, respectively, of U.S. Pat. No. 4,391,914, and Examples 11, 12, and 13 reflect Examples 7, 8, and 9, respectively, of U.S. Pat. No. 4,391,914, but with the addition of 150 ppm of $Cr_2O_3$ As can be observed, Examples 7, 8, and 9 of U.S. Pat. No. 4,391,914 have compositions coming within the ranges of the present invention except for the absence of $Cr_2O_3$.

Each batch was ballmilled, charged into a platinum crucible, and melted for 16 hours at 1625° C. The melt was poured into a steel mold to form a glass slab and the slab moved immediately to an annealer operating at 650° C.

TABLE III

|  | 8 | 9 | 10 | 11 | 12 | 13 |
| --- | --- | --- | --- | --- | --- | --- |
| $SiO_2$ | 69.5 | 68.5 | 68.0 | 69.5 | 68.5 | 68.0 |
| $B_2O_3$ | 2.5 | 2.5 | 2.5 | 2.5 | 2.5 | 2.5 |
| $Al_2O_3$ | 21.0 | 21.0 | 21.0 | 21.0 | 21.0 | 21.0 |
| $Li_2O$ | 4.5 | 4.5 | 4.5 | 4.5 | 4.5 | 4.5 |
| $K_2O$ | 1.25 | 2.0 | 1.75 | 1.25 | 2.0 | 1.75 |
| BaO | 2.1 | 1.5 | 2.25 | 2.1 | 1.5 | 2.25 |
| $TiO_2$ | 2.5 | 2.5 | 2.5 | 2.5 | 2.5 | 2.5 |
| $ZrO_2$ | 1.5 | 1.5 | 1.5 | 1.5 | 1.5 | 1.5 |
| $As_2O_5$ | 1.0 | 1.0 | 1.0 | 1.0 | 1.0 | 1.0 |
| $Cr_2O_3$ | — | — | — | 0.015 | 0.015 | 0.015 |

A sample of each slab was placed in an electrically heated furnace, and the temperature therein raised at about 300° C./hour to the nucleation temperature reported in Table IV below, held at that temperature for the time recorded, thereafter heated at about 300° C./hour to the crystallization temperature listed, and held at that temperature for the cited time. Those heat treatments correspond to the schedule set out for each glass in Table II of U.S. Pat. No. 4,391,014. Table IV also records a visual appraisal of the appearance of each sample after polishing the surfaces to a thickness of about 1 cm.

TABLE IV

| Example | Nucleation | Crystallization | Appearance |
| --- | --- | --- | --- |
| 8 | 730° C./2 hrs | 805° C./4 hrs | Moderate haze |
| 9 | 705° C./2 hrs | 800° C./4 hrs | Slight haze |
| 10 | 730° C./2 hrs | 870° C./1 hr | Opaque |
| 11 | 730° C./2 hrs | 805° C./4 hrs | Very slight haze |
| 12 | 705° C./2 hrs | 800° C./4 hrs | Haze-free |
| 13 | 730° C./2 hrs | 870° C./1 hr | Opaque |

The dramatic effect exerted by $Cr_2O_3$ in reducing haze is immediately evident when Example 8 is compared with Example 11 and Example 9 is compared with Example 12. As can be observed, the nucleating and crystallizing temperatures of those two schedules are within the operable ranges of the present invention. In contrast, the temperature of crystallization employed in Examples 10 and 13, viz., 870° C., is higher than can be tolerated in the instant invention, except for very short periods of exposure. Hence, the exposure of one hour resulted in an opaque article even with the inclusion of $Cr_2O_3$.

We claim:

1. Transparent glass-ceramic articles which display essentially no haze, which contain about 15-30% by volume of an aluminoborosilicate glass and β-quartz solid solution as essentially the sole crystal phase, and which exhibit moduli of rupture in the vicinity of 10,000 psi consisting essentially, expressed in terms of weight percent on the oxide basis, of 3–6% $Li_2O$, 17–23% $Al_2O_3$, 1–4% $B_2O_3$, 60–70% $SiO_2$, 3–6% $TiO_2$ and/or $ZrO_2$, 25–500 ppm $Cr_2O_3$, and 1–5 mole percent of a glass modifying oxide selected from the group consisting of 0–3% $K_2O$ and 0.5–2.5% SrO and/or BaO with a molar ratio $Al_2O_3:Li_2O > 1$.

2. Transparent glass-ceramic articles according to claim 1 wherein said $Cr_2O_3$ is present in an amount between about 70–150 ppm.

3. Transparent glass-ceramic articles according to claim 1 wherein said $K_2O$ is present in an amount between about 1–3% by weight and BaO is present in an amount of about 0.5–2.5% by weight.

4. Transparent glass-ceramic articles according to claim 2 wherein said $K_2O$ is present in an amount between about 1–3% by weight and BaO is present in an amount of about 0.5–2.5% by weight.

5. Transparent glass-ceramic articles which display essentially no haze, which contain about 15–30% by volume of an aluminoborosilicate glass and β-quartz solid solution as essentially the sole crystal phase, which contain substantial residual compressive stresses in the outside surfaces thereof, and which exhibit moduli of rupture up to about 15,000 psi consisting essentially, expressed in terms of weight percent on the oxide basis, of 3–6% $Li_2O$, 17–23% $Al_2O_3$, 1–4% $B_2O_3$, 60–70% $SiO_2$, 3–6% $TiO_2$ and/or $ZrO_2$, 25–500 ppm $Cr_2O_3$, and 1–5 mole percent of a glass modifying oxide selected from the group consisting of 0–3% $K_2O$ and 0.5–2.5% SrO and/or BaO with a molar ratio $Al_2O_3:Li_2O > 1$.

6. Transparent glass-ceramic articles according to claim 5 wherein said $Cr_2O_3$ is present in an amount between about 70–150 ppm.

7. Transparent glass-ceramic articles according to claim 5 wherein said $K_2O$ is present in an amount between about 1–3% by weight and BaO is present in an amount of about 0.5–2.5% by weight.

8. Transparent glass-ceramic articles according to claim 6 wherein said $K_2O$ is present in an amount between about 1–3% by weight and BaO is present in an amount of about 0.5–2.5% by weight.

* * * * *